Nov. 3, 1964     W. J. McGUIRE, JR., ETAL     3,155,159
INCREASING PERMEABILITY OF SUBSURFACE FORMATIONS
Filed Aug. 22, 1960                                    2 Sheets-Sheet 1

INVENTORS
William J. McGuire Jr.
William F. Kieschnick Jr,
Loyd R. Kern

ATTEST
Charles F. Steininger

BY
ATTORNEY

United States Patent Office 3,155,159
Patented Nov. 3, 1964

3,155,159
INCREASING PERMEABILITY OF SUBSURFACE FORMATIONS
William J. McGuire, Jr., Dallas, Loyd R. Kern, Irving, and William F. Kieschnick, Jr., Dallas, Tex., assignors to The Atlantic Refining Company, Philadelphia, Pa., a corporation of Pennsylvania
Filed Aug. 22, 1960, Ser. No. 51,149
12 Claims. (Cl. 166—29)

The present invention relates to an improved method for increasing the permeability of subsurface earth formations. In a more particular aspect, the present invention relates to an improved method for increasing the permeability of subsurface earth formations by depositing in an existing or created fracture a porous pack of particle-form propping agent.

It is now well known in the art of petroleum production techniques that subsurface formations containing hydrocarbons can be made more permeable and thus more readily produced if an existing fracture in the formation is propped open with a solid, particle-form propping agent or a fracture is created in the formation and thereafter propped open with such an agent. It is also known that the production rate of water-producing formations can be similarly improved and that increased injectivity of fluids into a formation can be obtained by such techniques. Generally, such fracturing and propping is carried out by disposing a fluid such as water, crude oil, kerosene, gelled water, gelled crude oil, gelled kerosene, or emulsions opposite the formation of interest and applying sufficient pressure to such fluid to crack the formation and form a fracture therein. Following such fracturing of the formation, a fluid carrying a suitable solid, particle-form propping agent is then injected and the propping agent is carried into the fracture by the carrier fluid. Leakoff or subsequent removal of the propping agent carrier will then deposit the propping agent between the walls of the fracture and the fracture will be held open. Since even very small-grained propping agents will usually result in a higher permeability through the propped fracture than through the formation itself, the ease with which fluids can be produced from or injected into a formation containing such fractures is, therefore, improved.

It has been the general practice in the fracturing art to use small-grained sand as a propping agent with the most widely used material being smaller than 20 mesh or 0.03 inch in diameter. There is, however, a definite limit to the increase in permeability which can be obtained by the use of such small-grained sand since such materials pack together very tightly and thereby result in fracture permeabilities less than that desired and sometimes less than the permeability of the formation being treated. The problem of poor permeability in sand-packed fractures becomes even more pronounced when moderately high pressures are encountered. Under such circumstances, the sand will tend to crush into small fragments and result in even lower permeabilities being obtained. Such tight packing and crushing have been overcome in accordance with copending application Serial No. 659,-496, filed May 6, 1957, now Patent No. 2,950,247, owned by the same assignee as the present application, which teaches the use of specific large-sized, noncrushable materials as propping agents for formation fractures. The use of such large-sized, noncrushable materials was found to result in fracture permeabilities which are several fold greater than that which can be obtained by the use of conventional small-sized sand. The outstanding advantages of using the large-sized, noncrushable materials of the parent application are found to exist irrespective of whether the sand merely packs tightly or crushes under the conditions of operation. It is further suggested in copending application Serial No. 659,718, filed May 16, 1957, now abandoned, that the large-sized, noncrushable materials can be deposited in the fracture in a sparse population, that is, rather than depositing a multi-layer pack of propping agent, one controls the conditions of operation so as to deposit either a single layer of the large-sized material or a single layer in which the individual propping particles are spaced one from the other leaving void spaces between the particles. Under these circumstances, it is obvious that sand of any size could not be conveniently used since the load per particle is greatly increased in a sparse population and the sand crushes into fragments which have been found to further reduce permeability.

Although the large-sized, noncrushable propping agents have proven vastly superior to small-grained sand, there are a number of problems encountered in the deposition of large-sized propping agents in a fracture, particularly the deposition of a sparse population of such agents, which require techniques varying widely from those previously employed in fracturing operations and, therefore, careful control by the operator.

It is, of course, obvious that larged-sized, noncrushable propping agents, such as alumina and aluminum, are quite expensive if such materials are to be utilized as the sole agent for propping an underground fracture. Therefore, it is desirable that the valume of such material be kept to a minimum without affecting the ultimate results of the fracture treatment. It has been suggested in co-pending application Serial No. 35,649, filed June 13, 1960, by Loyd R. Kern, now Patent No. 3,075,581, owned by the same assignee as the present application, that large-sized, noncrushable propping agents may be preceded by small-sized, low strength materials, particularly sand. It has been found in accordance with the present invention that the results obtained by using conventional small-sized materials in addition to the large-sized, noncrushable materials in a fracturing operation will not affect the ultimate result of the treatment if proper techniques are employed for the deposition of the respective materials in the fracture.

Another problem often encountered in formation fracturing operations occurs in reservoirs which have natural bottom water drives or oil overlaying water in the formation. Since most fractures obtained in normal operations are oriented in a vertical plane, fracturing such formations results in increasing the production of water as well as oil since there is no practical means of fracturing only the oil-bearing portion of a single formation. This problem can also be solved by practicing one variation of the method of this application.

It is, accordingly, an object of the present invention to provide an improved method of increasing the permeability of subsurface formations.

Another and further object of the present invention is to provide an improved method of increasing the permeability of a subsurface formation wherein a solid, particle-form material is deposited in a fracture in said formation.

Still another object of the present invention is to provide an improved method of increasing the permeability of subsurface formations wherein a small-sized, solid propping agent is first deposited in the fracture and thereafter a sparse population of large-sized, noncrushable propping agent is deposited.

A still further object of the present invention is to provide an improved method for increasing the oil productivity of formations which produce water from the bottom thereof.

These and other objects of the present invention will become apparent from the following detailed description when read in conjunction with the drawings, wherein.

In accordance with the present invention, it has been found that small-sized, particle-form materials may be deposited in a fracture by suspending such material in a fluid in which the settling rate of the solid material will be in excess of 0.1 foot per minute. Thereafter a large-sized propping agent is injected in a carrier fluid in which such large-sized propping agent will have a settling rate of less than 0.1 foot per minute.

As previously indicated, it is highly desirable to utilize less expensive propping agents to fill part of a fracture in which more expensive materials are to be used or to deposit solid materials in a particular portion of a fracture for various other purposes, such as plugging off a particular section of the formation. This end cannot be accomplished by conventionally practiced methods for the deposition of propping agents. The first aspect of the overall problem is that all previous techniques for the deposition of propping agents have been tied to the use of small-sized sand. Accordingly, serious difficulties have developed in the use of the large-sized materials set forth in copending application Serial No. 659,496, now Patent No. 2,950,247, because of the increase in size over conventional sand as well as the widely differing densities. Thus, while conventional carrier fluids and conventional techniques were adequate for the deposition of sand, the utilization of such materials and techniques cause premature settling and screenout where large-sized, noncrushable materials are employed. These problems are multiplied many times by efforts to deposit such large-sized, noncrushable materials in a sparse population.

By employing a carrier fluid which in essence will not support the first propping material or as a practical matter will have a falling rate in the carrier of greater than 0.1 foot per minute, one is able to deposit such first propping agent as a layer in the bottom of the fracture. This layering, or solid packing, of the propping agent first introduced is illustrated in FIGURE 1.

Figure 1:
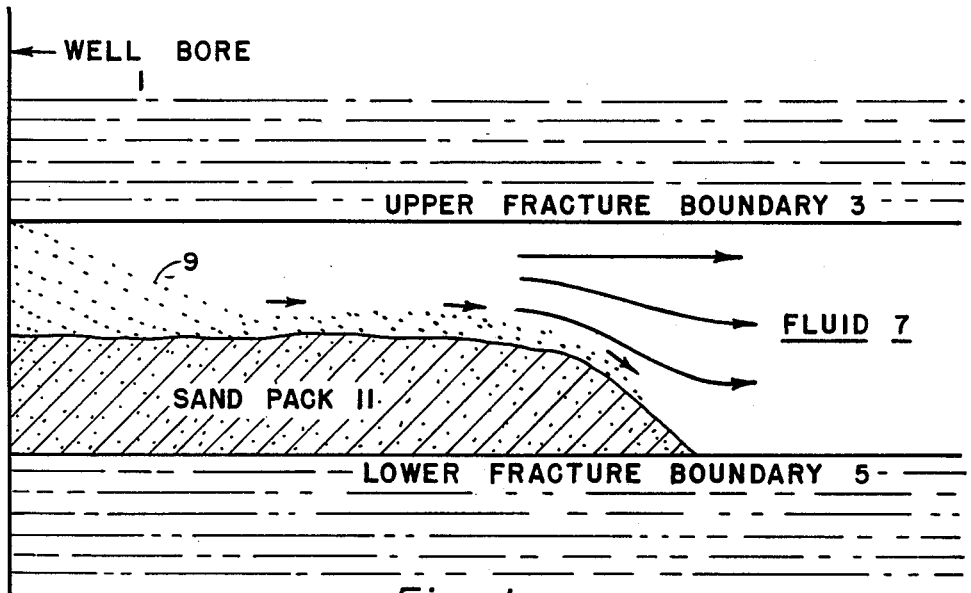
FIGURE 1 is a vertical section through a fracture in a subsurface earth formation showing the conditions which exist when a small-sized solid material is injected into the fracture as a first step of the present method.

FIGURE 1 shows a well bore 1 passing through the formation of interest. The formations forming the upper and lower boundaries of the formation of interest are designated 3 and 5, respectively. A portion of a vertical fracture 7 is shown extending through the entire vertical dimension of the formation of interest. As previously pointed out most fractures are vertically oriented. In addition, such vertical fractures will usually extend from the top to the bottom boundary of the formation near the borehole but will not extend into the formations above and below the formation of interest. The manner in which sand settles from a carrier fluid when the falling rate of the sand is in excess of about 0.1 foot per minute is illustrated at 9. Finally, a settled multi-layer pack of sand in the bottom of fracture 7 is indicated by 11. Sand pack 11 illustrates the condition which exists part way through the step of depositing a multi-layer pack of sand in the bottom of the fracture.

Figure 2:
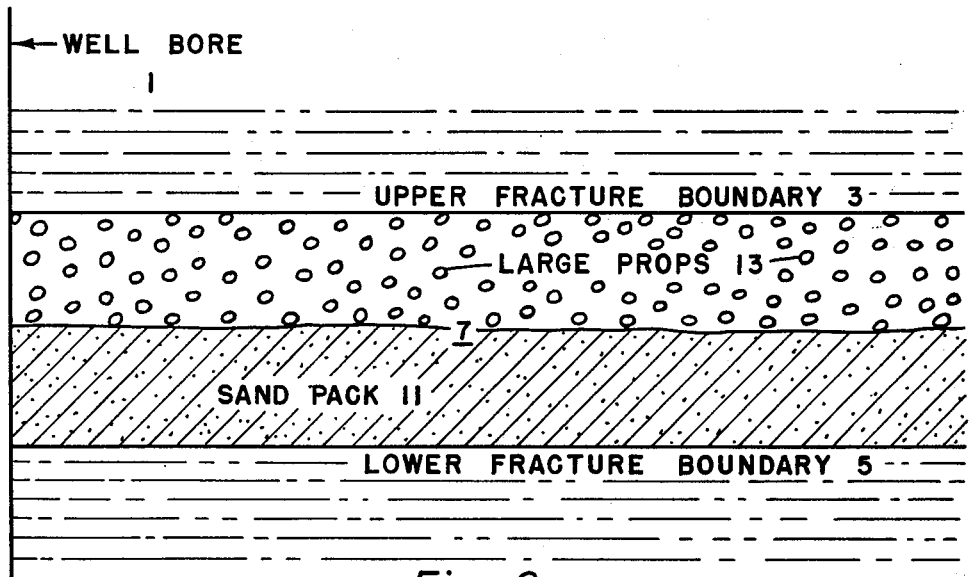
FIGURE 2 is likewise a vertical section of a subsurface formation similar to that of FIGURE 1 showing the situation which exists after the small-sized material has been deposited in the fracture and after the deposition in such fracture of large-sized, noncrushable materials in the second major step of the instant method.

Once a sufficient volume of small-sized material has been deposited in the bottom of the fracture, the permeable section of the fracture above this solid pack is then propped with a large-sized propping agent by suspending this second agent in a carrier fluid which will completely suspend the particles or in actual practice have a falling rate of less than 0.1 foot per minute. Such suspension of large particle-form material will then result in a single layer or less than a single layer of such agent being deposited in the top of the fracture. This is illustrated by FIGURE 2 where the same numerals utilized in connection with FIGURE 1 are employed to designate like elements in FIGURE 2. In the top of fracture 7 and above sand pack 11 is illustrated a sparse population of large-sized, non-crushable propping agent 13.

Figure 3:
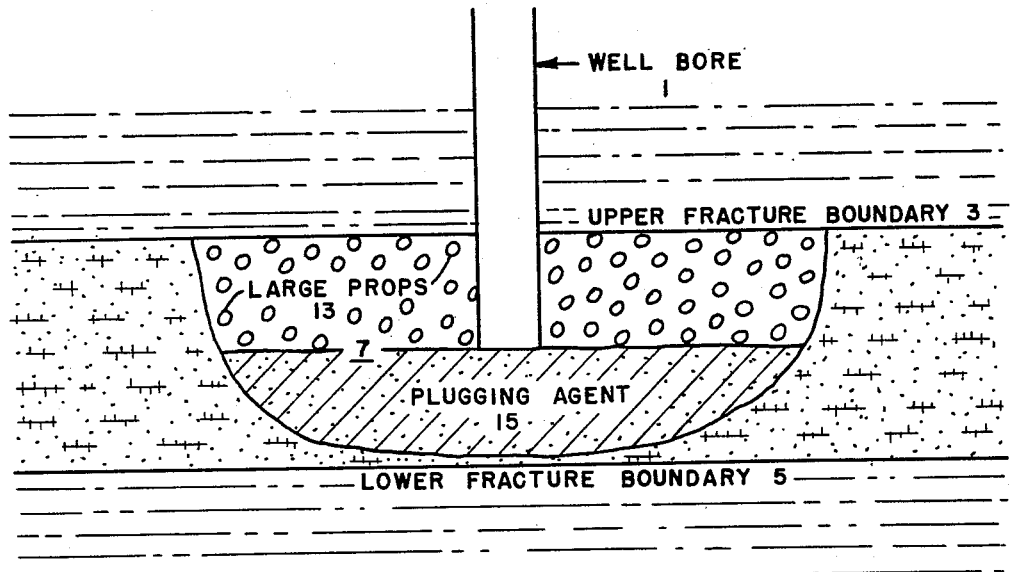
FIGURE 3 is a vertical section of a subsurface earth formation in which the formation adjacent the bottom of the well bore has been fractured and the water-bearing portion of said formation has been plugged in accordance with the present invention.

The method of depositing a multi-layer pack of sand in the bottom of a fracture and thereafter depositing a large-sized, noncrushable propping agent in the top of the fracture, as illustrated by FIGURES 1 and 2, is equally applicable to the deposition of a plugging agent in the bottom of a fracture to shut off water being produced from the bottom of the formation. In other words, the plugging agent is introduced in a carrier fluid in which it will settle at a rate of greater than 0.1 foot per minute in order to cause the plugging agent to settle in a multi-layer pack in the bottom of the fracture. The deposition of the plugging agent is then followed by a carrier containing a suitable propping agent to deposit propping agent in the top of the fracture and produce a permeable flow channel for oil being produced from the top portion of the formation. It should be recognized that in this variation of the present invention any suitable propping agent which will produce a propped fracture having a permeability greater than that of the formation itself and also greater than that of the plugging agent may be employed. For example, conventional sands may be deposited in the top of the fracture under suitable conditions or large-sized, noncrushable propping agents may be utilized either in a solid pack or in a sparse population. FIGURE 3 of the drawings illustrates a subsurface formation fracture in which the bottom, water-producing portion of the formation of interest has been plugged and the upper, oil-producing portion of the formation has been propped with a sparse population of large-sized, noncrushable propping agent. In FIGURE 3, fracture 7 is shown as having been produced in a formation at the bottom of well bore 1 where it will assume a generally hemispherical pattern, rather than a formation located above the bottom of the well bore as illustrated in FIGURES 1 and 2, and the plugging agent has been designated by numeral 15.

Figure 4:
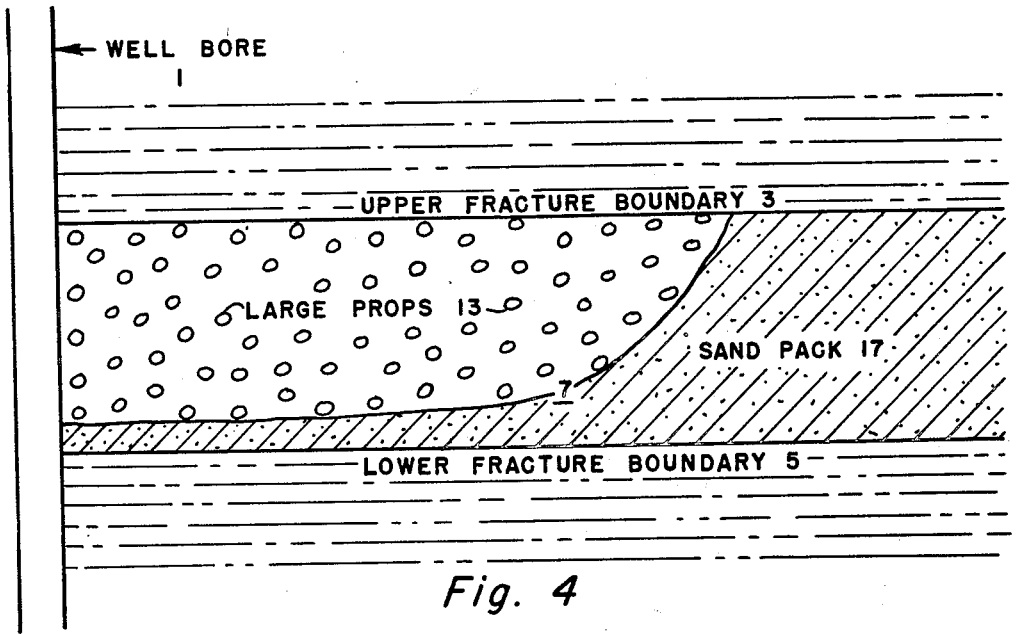
FIGURE 4 is a vertical section of a subsurface earth formation similar to FIGURES 1 and 2 but showing the situation which is brought about by the practice of one modification of the present invention.

FIGURE 4 of the drawings illustrates the result of practicing a modification of the method of depositing a multi-layer pack of a small-sized material in a fracture followed by the deposition of a sparse population of a large-sized, noncrushable material.

In accordance with the variation illustrated by FIGURE 4, the small-sized material is deposited in the bottom of the fracture in a multi-layer pack by utilizing a carrier fluid in which the small-sized material will settle at a rate in excess of 0.1 foot pe rminute. This will deposit a multi-layer pack of such small-sized material in the bottom of the fracture as illustrated in FIGURES 1 and 2. This introduction of small-sized material is then followed by the injection of a fluid containing no solid material. This fluid will pick up small-sized material which has settled near well bore 1 and wash it back into the portion of fracture 7 furthest from well bore 1 and form a multi-layer pack of small-sized material 17 in such remote section of the fracture. Thereafter, large-sized, non-crushable propping agent is suspended in a carrier fluid in which it will settle at a rate less than about 0.1 foot per minute in order to deposit such propping agent in that portion of the fracture adjacent well bore 1. As may be observed in FIGURE 4, the large-sized, non-crushable material is thus deposited in the fracture adjacent the well bore where it is most effective in improving the productivity or injectivity of the formation.

Whereas it has been the general practice to overflush with a liquid containing no propping agent following the introduction of the last portion of the propping agent in order to wash all propping agent out of the well bore and into the fracture, this practice has been found to be detrimental and should be avoided in the practice of this present invention. As a matter of fact, the operator should underflush in the practice of the present invention. Underflushing means simply that a portion of the carrier containing propping agent is left in the well bore and is thereafter removed by pumping, swabbing, etc., or, if the producing formation is above the bottom of the well, is simply permitted to settle to the bottom of the well where it will not interfere with production of the formation of interest. This practice of underflushing assures one that the propping agent will be deposited in the fracture adjacent the well bore rather than being washed away from the well bore thus permitting this critical portion of the fracture to partially or completely close.

Large-sized or the second propping agents as used herein is meant to include materials having an average particle size greater than 20 mesh or 0.03 inch in diameter. Suitable materials for use as large-sized propping agents are the manufactured, formable materials of metal, ceramic or plastic set forth in copending application Serial No. 659,496, now Patent No. 2,950,247, and include steel shot, alumina, aluminum, alloys of aluminum and other metals, glass beads and various plastics. Other suitable large-sized propping agents are naturally occurring organic materials which have specific gravities substantially less than the small-sized or first propping agents, such as sand, and include, crushed and rounded walnut shells, peach seeds, coconut shells, pecan shells, etc., and seeds such as grape seed and the like which have not been reduced in size. Such materials can be used in diameters as large as one-quarter inch depending upon the width of the fracture being propped. Such large-sized propping agents should be capable of supporting loads of 40 pounds per particle or more without fragmentation.

The small-sized materials referred to herein may include the same materials referred to above except that they will be less than 20 mesh or 0.03 inch in diameter; but, preferably they are inexpensive materials which exhibit particle strengths below 40 pounds per particle and in particular conventional sands.

When the term multi-layer pack is used herein, this term means a tight mass of particle-form material consisting of more than two complete layers of particles in a fracture whether the fracture be vertically or horizontally oriented. In contrast to a multi-layer pack, the term sparse population, as used herein, is meant to include a single layer of particles in a fracture with the individual particles in physical contact with one another or a single layer of particles in which void spaces exist between individual particles.

As previously indicated, since a high falling rate is required in the deposition of small-sized materials, such materials may be effectively carried in nonviscified or ungelled materials such as fresh or salt water. Where high suspension is required in the deposition of the large-sized propping agent, gelled or viscified fluids, having a viscosity substantially higher than the first fluid, such as gelled water, crude oils, kerosene, etc., or emulsions may be employed as the second carrier.

In that variation of the invention in which a plugging agent is employed to shut off bottom water conventional plugging agents are contemplated. For example, particles of barite, wood chips, calcium carbonate and many other materials heretofore suggested for plugging water-producing formations may be utilized. Preferably such plugging agent is an oil-soluble, water-insoluble material.

Although specific examples have been recited herein and specific materials referred to, it is to be understood that such references are by way of example only and should not be considered limiting. In addition, all terms except those defined should be given their usual and customary meanings as understood by those skilled in the art.

We claim:

1. In a method for increasing the permeability to fluids of a subsurface earth formation having at least one fracture extending from the wall of a well bore radially into said formation, the improvement comprising: forming a first suspension of a solid, particle-form material and a carrier fluid, wherein said solid particles will settle through said carrier fluid at a rate greater than 0.1 foot per minute; injecting said first suspension under pressure into said fracture, whereby said solid particles settle to form a solid, multilayer pack in the bottom of said fracture; forming a second suspension of a solid, particle-form material and a carrier fluid, wherein said solid particles settle through said carrier fluid at a rate less than 0.1 foot per minute; injecting said second suspension under pressure into said fracture, whereby said solid particles are maintained in suspension in said carrier fluid until said fracture is permitted to close against said solid particles; and releasing the pressure on said second suspension to permit said fracture to close.

2. In a method for increasing the permeability to fluids of a subsurface earth formation having at least one fracture extending from the wall of a well bore radially into said formation, the improvement comprising: forming a first suspension of a solid, particle-form material and a first carrier fluid, wherein said solid particles settle through said first carrier fluid at a rate greater than 0.1 foot per minute; injecting said first suspension under pressure into said fracture, whereby said solid particles settle to form a solid, multilayer pack in the bottom of said fracture; forming a second suspension of said solid, particle-form material in a second carrier fluid having a viscosity substantially higher than the viscosity of said first carrier fluid, and wherein said solid particles settle through said second carrier fluid at a rate less than 0.1 foot per minute; injecting said second suspension under pressure into said fracture, whereby said solid particles are maintained in suspension in said second carrier fluid until said fracture is permitted to close against said solid particles; and releasing the pressure on said second suspension to permit said fracture to close.

3. A method in accordance with claim 2 wherein the first carrier fluid is a non-viscified fluid and the second carrier fluid is a viscified fluid.

4. A method in accordance with claim 2 wherein that portion of the solid particles contained in the first suspension has a particle diameter less than about 0.03 inch and that portion of said solid particles contained in the second suspension has a diameter greater than about 0.03 inch.

5. A method in accordance with claim 2 wherein the solid particles are capable of supporting a load in excess of about 40 lbs. per particle without fragmentation.

6. A method in accordance with claim 2 wherein the solid particles are a manufactured, formable material selected from the group consisting of metallic, ceramic and plastic materials.

7. A method in accordance with claim 2 wherein the first carrier fluid is water and the second carrier fluid is a gelled fluid.

8. In a method for increasing the permeability to fluids of a subsurface earth formation having at least one fracture extending from the wall of a well bore radially into said formation, the improvement comprising: forming a first suspension of a first solid, particle-form material and a carrier fluid, wherein said solid particles settle through said carrier fluid at a rate greater than 0.1 foot per minute; injecting said first suspension under pressure into said fracture, whereby said first solid particles settle to form a solid, multilayer pack in the bottom of said fracture; forming a second suspension of a second solid particle-form material, having a specific gravity substantially less than that of said first particles, and said carrier fluid, wherein said second solid particles settle through said carrier fluid at a rate less than 0.1 foot per minute; injecting said second suspension under pressure into said fracture, whereby said second solid particles are maintained in suspension in said carrier fluid until said fracture is permitted to close against said solid particles; and releasing the pressure on said second suspension to permit said fracture to close.

9. A method in accordance with claim 8 wherein the first solid particles have a diameter less than about 0.03 inch and the second solid particles have a diameter greater than about 0.03 inch.

10. A method in accordance with claim 8 wherein both the first solid particles and the second solid particles are capable of supporting a load in excess of about 40 lbs. per particle without fragmentation.

11. A method in accordance with claim 8 wherein the first solid particles break into small fragments at loads of less than about 40 lbs. per particle and the second solid particles are capable of supporting a load in excess of about 40 lbs. per particle without fragmentation.

12. A method in accordance with claim 11 wherein the second solid particles are a manufactured, formable material selected from the group consisting of metallic, ceramic and plastic materials.

References Cited in the file of this patent
UNITED STATES PATENTS

| | | |
|---|---|---|
| 2,693,854 | Abendroth | Nov. 9, 1954 |
| 2,699,212 | Dismukes | Jan. 11, 1955 |
| 2,734,861 | Scott et al. | Feb. 14, 1956 |
| 2,774,431 | Sherborne | Dec. 18, 1956 |
| 2,859,820 | Trott | Nov. 11, 1958 |
| 2,962,095 | Morse | Nov. 29, 1960 |

UNITED STATES PATENT OFFICE
CERTIFICATE OF CORRECTION

Patent No. 3,155,159                                    November 3, 1964

William J. McGuire, Jr., et al.

It is hereby certified that error appears in the above numbered patent requiring correction and that the said Letters Patent should read as corrected below.

Column 2, line 29, for "valume" read -- volume --; column 4, line 62, for "pe rminute" read -- per minute --; column 6, line 60, for the claim reference numeral "2" read -- 5 --.

Signed and sealed this 6th day of April 1965.

(SEAL)
Attest:

ERNEST W. SWIDER                               EDWARD J. BRENNER
Attesting Officer                                Commissioner of Patents